Figure 1:
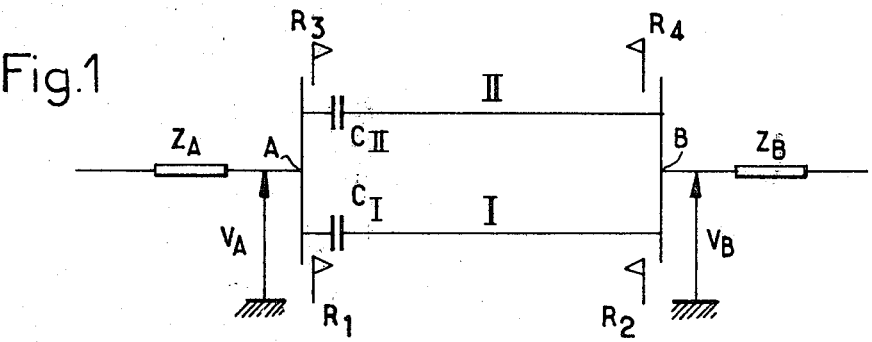

United States Patent [19]

Heller

[11] 4,325,098

[45] Apr. 13, 1982

[54] DETECTION OF THE POSITION OF A FAULT ON AN ELECTRIC LINK

[75] Inventor: Isabelle Heller, Meudon, France

[73] Assignee: Enertec, Montrouge, France

[21] Appl. No.: 165,483

[22] PCT Filed: Feb. 19, 1979

[86] PCT No.: PCT/FR79/00015
§ 371 Date: Oct. 23, 1979
§ 102(e) Date: Oct. 22, 1979

[87] PCT Pub. No.: WO79/00657
PCT Pub. Date: Sep. 6, 1979

[30] Foreign Application Priority Data

Feb. 23, 1978 [FR] France ............................ 78 05205

[51] Int. Cl.³ .......................................... H02H 7/26
[52] U.S. Cl. ...................................... 361/82; 361/84; 361/67
[58] Field of Search ............... 361/66, 65, 62, 82, 361/84, 85, 86, 67–69; 324/51, 52

[56] References Cited

U.S. PATENT DOCUMENTS

| | | | |
|---|---|---|---|
| 3,144,585 | 8/1964 | Blakemore | 361/66 |
| 3,312,866 | 4/1967 | Rockefeller, Jr. | 361/85 X |
| 3,320,481 | 5/1967 | Ungrad | 361/66 |

FOREIGN PATENT DOCUMENTS 458486 3/1928 Fed. Rep. of Germany.
646348 5/1937 Fed. Rep. of Germany.
929693 1/1948 France.

Primary Examiner—Patrick R. Salce
Attorney, Agent, or Firm—Dale Gaudier; Mikio Ishimaru

[57] ABSTRACT

A method for the directional detection of faults on power transmission lines is described.

According to one embodiment applied to a link comprising several lines in parallel each provided, towards each of their respective ends, with a directional relay, the indications from all of these relays in response to the detection of a fault on the link, are combined to determine the presence or the absence of the fault on the lines under consideration. In particular, this method is applicable to lines compensated with series capacitors at the beginning of the line.

8 Claims, 5 Drawing Figures

DETECTION OF THE POSITION OF A FAULT ON AN ELECTRIC LINK

The present invention relates to a detection system of the directional type for monitoring electric power transmission links, especially over long distances.

It should first be noted that an electric power transmission line or link should not be considered alone but as a part of a complex network of lines. Thus, when a fault appears on a line, the disturbances created by this fault may have repercussions throughout the network with more or less effect.

In order to satisfactorily monitor a line in a network, it is necessary to take certain precautions. In the first place, all the lines are monitored by devices known as "fault detectors" which give a signal at their output when a fault appears on the network. These detectors which are known in themselves, are for instance of the impedance characteristic type. Moreover, at each node of the lines, devices are preferably connected to distinguish forward and backward direction along the lines relative to this measurement point, and thereby determine whether a fault is "backward" or "forward" of this point. Therefore, if one of these devices is placed at each end of a line, with the forward direction for each being towards the line, and both indicate a "forward" fault, the latter will be on the line. If one gives a "backward" indication, the fault is then exterior to the line. These devices are known as directional relays.

When such measurements are carried out, the monitoring systems comprise in addition protection devices which analyse the "fault" and, depending upon the results of these analyses, disconnect the line from its supply sources in order to protect the line against any damage which might occur on it and even cause its destruction, at least partially.

These devices are known by those skilled in the art as "protection relays".

It should moreover be noted that faults are seldom short-lived. As an example, if the fault has been caused by a short circuit due to a foreign body, this foreign body is very likely to maintain the short-circuit. In such cases it is therefore necessary to locate the fault, especially for long distance lines, so that the specialized repair team nearest to the fault may act as quickly as possible and restore the line. There are devices in parallel with the protection relay which analyse the various signals collected on the line to determine the distance between the fault and a measurement point. These latter devices are known as fault locators.

The existing devices allow good results in most cases for the various needs mentioned above.

On the other hand, it has been realized that even the most recent directional relays could provide erroneous results on certain links in which transmission is effected by two or more lines in parallel, especially when these lines are compensated by capacitors. Under certain conditions, a directional relay is likely to indicate a backward fault while the actual fault is in the forward direction.

In this regard, it should be recalled that in order to increase the power transmitted along the lines, improve the stability of the networks and utilize very long lines, these lines can be compensated. Such compensation is typically provided by several capacitor banks in series with the lines. These capacitors can be placed, according to the particular case, at different points on the line. Anyway, the overall compensation factor on the lines thus equipped with capacitors, varies on average from thirty to seventy percent, which, in any case, causes the total resulting impedance of the compensated lines to remain predominantly of the inductive type.

With this in mind, and as indicated above, the monitoring of a line is always performed from one point on the line. A line always exhibits, when it is viewed from this point, a certain reactance which, with a good approximation, is proportional to the line's length as seen from this point, in the absence of any capacitor. When a fault occurs on that line, the distance between this fault and the measurement point will be a linear function of the reactance per unit length of this line. Throughout the following description, this total reactance of the line portion between the measurement point and the fault will be designated as X.

It is possible to determine whether a fault is forward or backward of the measurement point, with respect to which the value of the reactive X is measured, by studying the value of this reactance X through various means. The directional relays known up to now have been arranged in all instances to determine the location of a fault by taking this reactance X as the analysis parameter. Such determination however proves more difficult in the case of several parallel lines, particularly when they are equipped with compensation capacitors. It is an object of this invention to provide a method and an apparatus to overcome these problems and to determine the direction or the position of a fault on an electric link.

According to one aspect of the invention, the position of a fault on an electric link comprising at least two lines in parallel each provided towards each of their respective ends with a directional unit, is detected by combining the indications from at least three of such directional units in response to the detection of a fault on the link, to determine whether this fault is located on one of these lines; if so, it can be determined on which one of these, with the indication from the fourth unit.

According to another aspect of the invention, there is provided apparatus comprising means to obtain at least three directional indications from at least three of the units associated with the lines of the aforesaid electric link, and means for combining these three indications to produce an indication of the position of the fault with respect to at least one of these lines.

Figure 2:
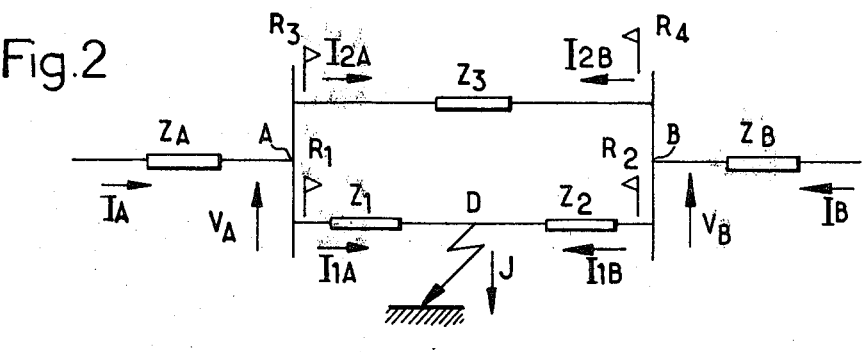
Figure 3:
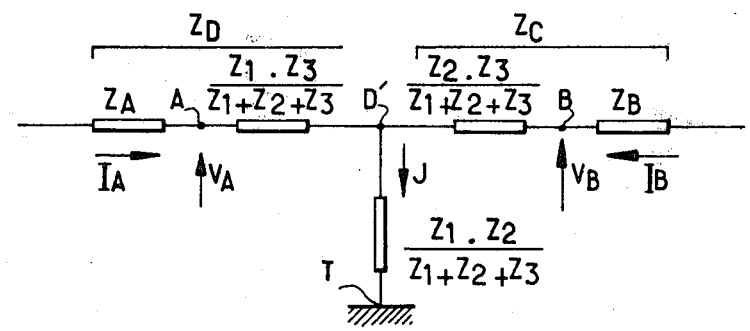
Figure 4:
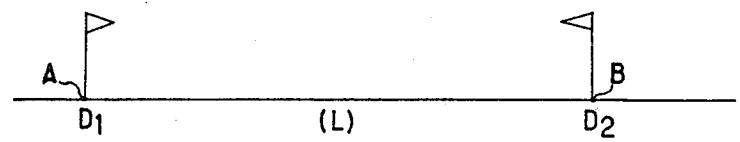
Figure 5:
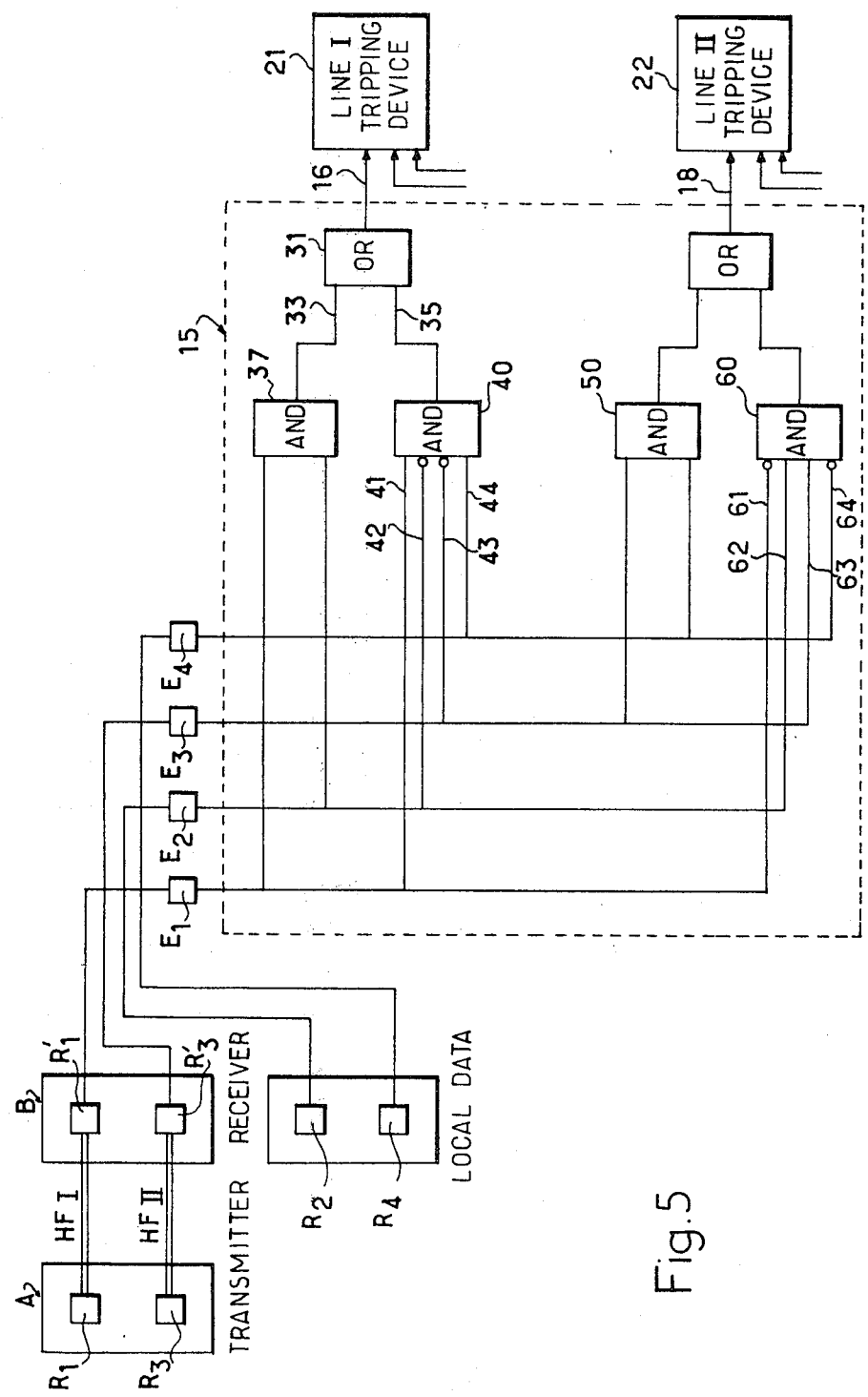

Other aspects and advantages of this invention will be apparent from the following description with reference to the appended drawings in which:

FIG. 1 represents schematically an electric link comprising two lines in parallel;
FIG. 2 is an electrical diagram of this link;
FIG. 3 is a diagram equivalent to that of FIG. 2;
FIG. 4 illustrates the symbolic representation used for the directional relays which monitor a line; and
FIG. 5 is a block diagram of an exemplary device embodying the principles of the invention.

An embodiment of the invention applied to directional detection on parallel lines compensated by series capacitors placed at the beginning of the line, will now be described.

In conventional directional protection, a directional relay or unit is placed at each end of a line (L) to provide a directional indication. The protective relay $D_1$ in FIG. 4 is connected so as to look at the line with which it is associated along a forward direction (the direction in which the representative marked points in FIG. 4), the backward direction thus corresponding to that part of the electric link located outside the line in question with respect to the measurement point of the relay. In other words, the currents and voltages at the point where the relay is located are measured with reference to a direction along the line determined at this point (for instance, from A to B at point A). Since each end of the line (L) is equipped with a respective relay $D_1$ and $D_2$, if these two relays $D_1$ and $D_2$ provide a forward fault indication, a fault can be declared on the protected line when a starting unit such as an impedance relay has previously detected the occurrence of a fault. The transmission of the indications of one of these relays, from one end of the line to the other, is conventionally carried out by HF transmission on the line in order to combine the two directional indications.

It should also be noted that only one indication that the fault is backward of the relay is sufficient to block the tripping of a cut-out, circuit-breaker or the like, which protects the line.

Two procedures are usually used to implement these functions and are described hereafter with reference to FIG. 4, in which the forward direction along the line (L) for each protection unit $D_1$ and $D_2$ is that in which the representative marker points.

PERMISSIVE OVERREACH PROCEDURE

Protection unit $D_1$ sends to end B a permissive overreach signal when it "sees" the fault in the forward direction; it sends no signal when it sees the fault in the backward direction.

Tripping on the line is normally effected by opening the line at both ends, if protection unit $D_2$ receives from protection unit $D_1$ a permissive overreach indication and if protection unit $D_2$ sees the fault in the forward direction and therefore also sends a tripping authorisation signal to protection unit $D_1$.

BLOCKING PROCEDURE

Protection unit $D_1$ sends to protection unit $D_2$ a blocking signal when it "sees" a fault in the backward direction; when it sees the fault in the forward direction, it provides no signal.

If, in the absence of any blocking signal from protection unit $D_1$, protection unit $D_2$ sees the fault in the forward direction, tripping is caused.

The foregoing is a very short summary of the principles used in the "TELEPROTECTION" technique. These principles and their implementation are discussed in great detail in a paper published in March 1969 by CIGRE (Conference Internationale des Grands Reseaux Electriques—International Conference on Large Electric Networks—112 Bd Haussman—75008 PARIS) and entitled "TELEPROTECTION" (317 pages).

This bilingual English-French publication is a result of the report produced by a common group working on these questions, and not only discusses the conditions under which protection systems are operated in response to signals received from various sources, but also describes the methods for transmitting these signals (telecommunication systems) to link the various protection units together.

A conventional working principle of directional relays is based on the local phase comparison of voltage and current magnitudes measured at one point (referred to as the measurement point) at one end of the line. It is the result of this comparison which provides the forward/backward indication eventually transmitted to the other end of the line.

Thus for instance, in the directional relays known as total impedance relays, the phase of a voltage existing at the measurement point before the fault occurs (memorized voltage) is compared with that of the current measured at the measurement point where the relay is located after the fault occurs. This phase comparison is conveniently expressed in terms of the ratio of complex quantities representing the voltage and the current in question. When this ratio is positive, it indicates a phase concordance between the terms of the ratio, which corresponds to a fault forward of the measurement point. In the opposite case (negative ratio, phase discordance) the fault is in the backward direction.

With a more recent type of relay, known as a backward impedance relay, the phase comparison can be performed between the difference in the voltages measured after and before the occurrence of the fault on the one hand, and the current after the fault occurrence on the other hand. The conclusions drawn from this comparison are analogous, with the exception of the sign, to those provided by the total impedance relay, that is to say that a phase discordance (negative ratio) is considered as characterizing a fault forward of the measurement point and that a phase concordance (positive ratio) corresponds to a backward fault.

When dealing with a line between two points A and B, a forward fault indication provided by each of the protection directional relays or units at A and B, is normally necessary and sufficient to determine whether a fault, whose existence is concurrently detected by another device, is actually on the line.

With the development of complex electric networks, it has been realized however that, in certain cases, a fault could occur between two points A and B of a line without the directional units provided at each end indicating any fault in the forward direction. The result is therefore an apparent ambiguity in interpreting the indications provided by these directional units, which ambiguity is associated with the position of the fault between the points A and B along the line and, consequently, with the values of the complex impedances of the line portions situated between the fault point D and the points A and B respectively (impedances $Z_1$ and $Z_2$ for line I represented in FIG. 2).

According to the present invention, it has been found that it was possible to remove the apparent ambiguity which may occur in certain configurations of the network, involving parallel lines between two points A and B on the network, by combining at least in certain circumstances, the indications from the directional units associated with one of the lines, with those from at least another directional unit associated with another line between these points.

It will now be shown with particular reference to the two following examples, how to remove the ambiguity in question when it affects two (or more) lines in parallel between A and B, which are equipped with compensating capacitors connected in series in the vicinity of one of their ends A or B, this end being the same for each line. A device designed to remove this ambiguity will also be described.

In the configuration just indicated above, this device enables normal teleprotection to take place when the two directional units associated with the ends of one of the lines both indicate a forward fault. In case a combination of contradictory directional indications appears on the parallel lines, the device reacts as if the directional indications provided by each directional unit associated with the lines at the end opposite to that of the compensating capacitors, had been inverted, in order to either permit or inhibit, depending on the result of such inversion, the tripping of one of the lines through the action of teleprotection.

FIG. 1 represents an electric link or network portion wherein two lines I and II are connected in parallel between two bus-bars A and B. Each of these lines I and II is equipped with a respective compensating capacitor $C_I$ and $C_{II}$, connected in series on the line to the bus-bar A. There is no compensating capacitance in the vicinity of the bus-bar B.

The ends A and B of line I are equipped with respective directional units $R_1$ and $R_2$, while the corresponding ends of line II are equipped with directional units $R_3$ and $R_4$, respectively.

FIG. 2 is the electrical diagram corresponding to FIG. 1, when it is assumed that a fault affects line I at a point D such that the impedances of the line portions between the junctions A and B respectively and the fault point are $Z_1$ and $Z_2$ respectively. The impedance of line II is represented by $Z_3$. $V_A$ and $V_B$ are the voltages measured at A and B after the fault has occurred. $Z_A$ and $Z_B$ are the backward impedances relative to the link AB as seen from A and B, respectively. $I_A$ and $I_B$ are the respective currents through $Z_A$ and $Z_B$. $I_{1A}$, $I_{1B}$, $I_{2A}$ and $I_{2B}$ are the currents at the ends A and B of lines I and II, as indicated by the numerical and alphabetical subscripts of these currents. Thus, for example, $I_{1A}$ is the current measured at the end A of line I and feeding the directional unit $R_1$. The fault current has been designated as J, and in the situation assumed in FIG. 2 this current flows from point D of line I to earth. The capital notations used for voltages, currents and impedances are complex notations at a given frequency and in the steady state.

Voltages $V_{AM}$ and $V_{BM}$ at measurement points A and B just prior to the occurrence of the fault, which are memorized so that the respective units may derive their directional indications as has been explained above, will also be considered in the following. In addition the voltage $V_D$ at fault point D before the fault has occurred, will be deemed in the following notations to be substantially equal to $V_{AM}$ and $V_{BM}$, on the assumption that the value of the load current is zero or at least negligible relative to the fault current.

Finally, three particular values for the impedance $Z_1$ will also be considered in the forthcoming examples ($Z_1$ varies depending on the position of fault D), (impedance and reactance will hereafter be considered as equivalent), these values $(Z_1)_1$, $(Z_1)_2$, and $(Z_1)_3$ being related to each other through the following inequalities $$(Z_1)_3 < (Z_1)_2 < (Z_1)_1 < 0$$

In the light of the foregoing definitions and explanations, some examples embodying the invention for two types of directional device will now be examined:

First device: Total impedance measurement (see "Memory Directional Relay", for instance in Report 34,02 1974 CIGRE, p. 7 (Conference Internationale des Grands Reseaux Electriques Haute Tension—International Conference on Large High Tension Electric Networks—, (II2 Bd Haussman 75008 PARIS by Souillard, Sarquiz and Mouton).

When total impedance is measured, the magnitudes measured at each measurement point are the memorized voltage and the current. In other words, the directional relays $R_1$–$R_4$ utilize a memorized voltage measurement ($V_{AM}$, $V_{BM}$) and a current measurement $I_{1A}$, $I_{1B}$, $I_{2A}$ and $I_{2B}$, respectively.

The various results of phase comparisons between memorized voltages and current ($Z_2 > 0$) are summarized in the following Table I:

TABLE I

|  | $V_D/I_{1A}$ | $V_D/I_{1B}$ | $V_D/I_{2A}$ | $V_D/I_{2B}$ |
|---|---|---|---|---|
| $Z_1 > 0$ | + | + | + | − |
|  |  |  |  | or |
| $Z_2 > 0$ |  |  | − | + |
| $(Z_1)_1 < Z_1 < 0$ | + | + | − | + |
| $(Z_1)_2 < Z_1 < (Z_1)_1$ | + | − | − | + |
| $Z_1 < (Z_1)_2$ | − | + | + | − |

The symbol + corresponds to the directional indication "forward fault".
The symbol − corresponds to the directional indication "backward fault".

It is generally accepted that flash over of the spark-gaps at the capacitor terminals is certain when the total impedance is negative. The capacitors $C_I$ and $C_{II}$ are actually generally protected by spark-gaps, which flash when the current reaches dangerously high values. It can be shown (see, for example, the calculations developed hereinafter) that the transition of $Z_1$ to the value $(Z_1)_2$ would correspond to a sign inversion in the expression $V_D/J$ as it passes through zero, which corresponds to very high values of the fault current (tending to infinity). Consequently, the last case $Z_1 < (Z_1)_2$ does not occur; only the three first cases can exist.

The first two cases $(Z_1 > (Z_1)_1)$ correspond to tripping on the faulty line I, while one of the two directional units on the undisturbed line II blocks, in accordance with the previous explanations relating to teleprotection.

The third case is one of non-tripping on each line with an apparent ambiguity: the fault is backward of B according to unit $R_2$ ($V_D/I_{1B}$ negative) and backward of A according to unit $R_3$ ($V_D/I_{2A}$) negative).

The device contemplated for the practicing of the invention effects a particular processing of the phase comparison indications in the case which is characterized by the presence of a seen fault, without tripping one of the two lines:

it is capable of inverting the directional indications at B (the opposite end from the capacitors) and considering the data provided in A (where the capacitors are connected).

The combination of these new directional indications shows the presence of a fault on line I, whose two directional units $R_1$ and $R_2$ now see the fault in the forward direction, and the absence of a fault on line II whose two directional units $R_3$ and $R_4$ see the fault in the backward direction.

Put another way, it may be considered that the contemplated device directly considers the following combination:

forward fault seen at A on line I (the end where the capacitors are)

backward fault seen at B on line I backward fault seen at A on line II (the end where the capacitors are)

forward fault seen at B on line II as characterizing a fault on lineI, and causes tripping on this line.

In the case of a permissive overreach procedure the following logical combination seen at B will be considered as characteristic of a fault on line I:

permissive overreach signal on line I, no permissive overreach signal on line II,
backward directional indication on line I,
forward directional indication on line II.

In a blocking procedure the following logical combination:

no blocking signal on line I,
blocking signal on line II,
backward directional indication on line I,
forward directional indication on line II will be characteristic of a fault on line I.

In practice, the device can be designed to react to this combination in addition to combinations of lines 1 and 2 of Table I to cause tripping.

Therefore, the four phase relation indications listed in the four columns of Table I can be combined, after transmission to one of the ends of the line or line portion, in a logical device which will cause tripping of line I in the presence of one of the logical combinations appearing in the three first lines of this Table and characterizing a fault on that line.

By way of example, a device of this kind is represented in the block diagram of FIG. 5 inside the dotted frame 15, wherein a logical circuit based on AND and OR gates implements the truth table described above for the end B of the link in question.

The station located at this end is equipped with directional relays $R_2$ and $R_4$, respectively scanning lines I and II towards point A.

Additionally, it comprises two receivers $R'_1$ and $R'_3$ which receive the information transmitted at high frequency on lines I and II respectively, by the two directional relays $R_1$ and $R_3$ scanning the lines to which they are respectively attached, in the direction of B. These relays $R_1$ and $R_3$ are provided with transmitters which communicate through links HFI and HFII with their respective receivers $R'_1$ and $R'_3$, according to one of the procedures described in the above-mentioned paper "TELEPROTECTION".

The signals from receivers $R'_1$ and $R'_3$ and from relays $R_2$ and $R_4$ are applied to the inputs $E_1$, $E_3$, $E_2$, $E_4$ of circuit 15 associated with station B. A logical level 1 on one of the inputs $E_1$ to $E_4$ corresponds to an indication that the relay $R_1$ to $R_4$ of the same subscript "sees" the fault in the forward direction.

The circuit 15 has two outputs 16 and 18 each controlling a device which trips a respective line, such devices being designated by reference numbers 21 for line I and 22 for line II.

The output 16 is feed by an OR gate 31 with two inputs 33 and 35. The input 33 is controlled by an AND gate 37 with two inputs respectively connected to the inputs $E_1$ and $E_2$ of the device, so that, if relays $R_1$ and $R_2$ both see the fault forward of their respective positions, a command for the tripping of line I will be transmitted through the OR gate 31 on the output 16.

The input 35 of this OR gate 31 is controlled by an AND gate 40 with four inputs 41, 42, 43 and 44, respectively connected to the inputs $E_1$, $E_2$, $E_3$ and $E_4$. Inputs 42 and 43 are inverting inputs so that a tripping command for line I will be transmitted through the OR gate 31 on the output 16 when $R_1$ and $R_4$ see the fault in the forward direction, while $R_2$ and $R_3$ see it in the backward direction.

The tripping device for line II can be actuated similarly under the control of two AND gates 50 and 60.

The AND gate 50 with two inputs connected to $E_3$ and $E_4$ detects the condition of a fault seen in the forward direction by both the relays $R_3$ and $R_4$ which monitor line II. The AND gate 60, with four inputs 61 to 64 (two of which, 61 and 64, are inverting) respectively connected to the four inputs $E_1$ to $E_4$, controls the opening of line II in the complementary situation to that which causes the AND gate 40 to react, that is to say, a backward fault seen by $R_1$ and $R_4$ and forward fault seen by $R_2$ and $R_3$.

Any ambiguity occurring as to the line to be tripped is thus removed in the situations detected by AND gates 40 and 60. Their action can be summarized as producing a tripping authorization of the respective line I or II at station B, as if the indications from $R_2$ and $R_4$ (the relays located at station B remote from the capacitors) had been inverted in the case where the ambiguity appears. They also influence the operation of teleprotection to possibly transmit to station A the corresponding signal for the faulty line, either within the scope of the permissive overreach procedure (transmission), or within that of the blocking procedure (end of transmission).

However, it is still obvious that if, for example, the relays $R_1$ and $R_3$ at point A see a forward fault while relays $R_2$ and $R_4$ locate this same fault in the backward direction, there is no ambiguity and there will be no command for tripping the lines I and II.

The advantage of such a device is that it retains the benefit of the total impedance directional device, which permits measurement of the voltage forward of the capacitors and facilitates the high frequency transmission of the directional indications from one end to the other.

Second directional device: Backward impedance measurement (see French patent application No. 77 03569 filed 9th Feb. 1977 by Compteurs Schlumberger and published under the No. 2 380 631 on 8th Sept. 1978).

When the backward impedance is measured, the measured magnitudes are at each point the voltage change (voltage after fault-voltage before fault), and the current.

The phase comparisons between the measured voltage and current can be summarized in the following Table II:

TABLE II

| | $(V_A - V_D)/I_{1A}$ | $(V_B - V_D)/I_{1B}$ | $(V_A - V_D)/I_{2A}$ | $(V_B - V_D)/I_{2B}$ |
|---|---|---|---|---|
| $Z_1 > 0$ | − | − | + | − |
| | | | or | |
| $Z_2 > 0$ | | | − | + |
| $(Z_1)_1 < Z_1 < 0$ | − | − | + | − |
| $(Z_1)_3 < Z_1 < (Z_1)_1$ | − | + | + | − |
| $Z_1 < (Z_1)_3$ | − | − | + | + |

The symbol − corresponds to the directional indication "forward fault".
The symbol + corresponds to the directional indication "backward fault".

The contemplated device may be implemented in the same manner, but with an input sign inversion, as the device of FIG. 5 and similarly proceeds to a particular processing of phase comparison indications when a fault is detected in the absence of any tripping on both lines:

it is capable of inverting the directional indications at B (the opposite end from the capacitors) and takes into account the data provided in A. In another form, it considers the following combination:

forward fault seen at A on line I (the end where the capacitors are connected), backward fault seen at B on line I, forward fault seen at A on line II (the end where the capacitors are connected), backward fault seen at B on line II, as characterizing a fault on line I and causes this line to be tripped.

The advantage of such a device is that it functions in all possible conditions: it thus makes no assumption as to the spark-gap flashover condition at the capacitor terminals.

It can be attempted to formulate a justification of the above results as they are summarized in Tables I and II, by examining the phase of all the accessible magnitudes at each end of both lines I and II as compared to that of a reference magnitude, which is chosen to be the fault current J affecting the line I. This leads to the Table III below, from which the Tables I and II previously discussed are derived by eliminating the reference term J and which only involve the respective magnitudes as directly measured by the directional units $R_1$, $R_2$, $R_3$ and $R_4$, each for the end to which it is attached.

A certain number of initial assumptions will be made:

all the resistive terms are neglected (attention will be particularly directed to true faults);

the load current is assumed to be zero (or negligible compared to the fault current).

Since the line compensation is lower than 100%, reactances $Z_A$, $Z_1+Z_2$ and $Z_3$ are positive at the fundamental frequency, for example 50 Hz.

The magnitudes available at each measurement point A and B to feed the protection units are the voltages $V_A$ and $V_B$, the memorized voltages (before the fault) $V_{AM}$ and $V_{BM}$ at the measurement points A and B, and the currents $I_{1A}$, $I_{1B}$, $I_{2A}$ and $I_{2B}$.

The diagram of FIG. 3 which is equivalent to that of FIG. 2, can be drawn by applying the star-delta transformation, that is to say, by replacing the triangle A, D, B of FIG. 2 wherein D is the fault point, by a star circuit with node D' and ends A, B and T (earth), the branches of which have the following impedances:

$$D'A: \frac{Z_1 Z_3}{Z_1 + Z_2 + Z_3}$$

$$D'B: \frac{Z_2 Z_3}{Z_1 + Z_2 + Z_3}$$

$$D'T: \frac{Z_1 Z_2}{Z_1 + Z_2 + Z_3}$$

We define:

$$Z_T = Z_1 + Z_2 + Z_3$$

$$Z_D = Z_A + \frac{Z_1 Z_3}{Z_T}$$

$$Z_C = Z_B + \frac{Z_2 Z_3}{Z_T}$$

$$Z_G = Z_C + Z_D$$

$V_D$ being the voltage before the fault at the fault point and the load current being zero, we may write:

$$V_{AM} = V_{BM} = V_D$$

The voltage and current values concerning each measurement point can be determined as a function of the fault current J (fault on the line I):

$$I_A = J \cdot \frac{Z_C}{Z_C + Z_D}$$

$$I_B = J \cdot \frac{Z_D}{Z_C + Z_D}$$

$$V_A = \frac{Z_1 Z_3}{Z_T} I_A + \frac{Z_1 Z_2}{Z_T} J$$

$$= J \cdot \frac{Z_1}{Z_T} \cdot \frac{Z_3 Z_C + Z_2 (Z_C + Z_D)}{Z_C + Z_D}$$

By symmetry:

$$V_B = J \frac{Z_2}{Z_T} \cdot \frac{Z_3 Z_D + Z_1 (Z_C + Z_D)}{Z_C + Z_D}$$

$$I_{1A} = \frac{V_A}{Z_1} = J \cdot \frac{Z_3 Z_C + Z_2 (Z_C + Z_D)}{Z_T (Z_C + Z_D)}$$

$$I_{1B} = \frac{V_B}{Z_2} = J \cdot \frac{Z_3 Z_D + Z_1 (Z_C + Z_D)}{Z_T (Z_C + Z_D)}$$

$$I_{2A} = \frac{V_A - V_B}{Z_3} = J \frac{Z_1 Z_C - Z_2 Z_D}{Z_T (Z_C + Z_D)}$$

$$= J \frac{Z_1 Z_B - Z_2 Z_A}{Z_T (Z_C + Z_D)}$$

$$I_{2B} = J \frac{Z_2 Z_A - Z_1 Z_B}{Z_T (Z_C + Z_D)}$$

$$V_D = J \left( \frac{Z_1 Z_2}{Z_T} + \frac{Z_C Z_D}{Z_C + Z_D} \right) =$$

$$J \frac{Z_1 Z_2 (Z_C + Z_D) + Z_C Z_D Z_T}{Z_T (Z_C + Z_D)}$$

When it is desired to compare the phase of these magnitudes at the different points with that of the fault current, three classes of cases must be contemplated (impedance and reactance will here be considered as equivalent).

$Z_1 > 0$, $Z_2 > 0$     (1)
$Z_1 < 0$, $Z_2 > 0$ which may happen if the capacitors are at A     (2)
$Z_1 > 0$, $Z_2 < 0$ which may happen if the capacitors are at B     (3)
   (symmetrical to case 2).

Case 2 will be discussed in detail since the case 1 is similar to that of a normal line without capacitor.

When $Z_1 < 0$ and $Z_2 > 0$, we my write, using the above equations:

$V_A/J < 0$, $I_{1A}/J > 0$, $I_{2A}/J < 0$, $I_{2B}/J > 0$ and
$V_A - V_D/J > 0$ The phases of $I_{1B}$, $V_B$, $V_D$ and $V_B - V_D$ relative to that of J depend on the value of $Z_1$.

It can be seen that $V_B$ and $I_{1B}$ always remain in phase.

It is interesting to examine the sign changes of a number of expressions in terms of the value of $Z_1$. In particular, it may be shown that: $V_B/J$ reverses its sign as it passes through zero when $Z_1=(Z_1)_1$ and therefore that the phase relation between $V_A$ and $V_B$ changes when $Z_1=(Z_1)_1$.

The physical meaning is that as long $Z_1<(Z_1)_1$, $V_B$ maintains the sign it had before the fault occurred; as $Z_1$ becomes smaller than $(Z_1)_1$, $V_B$ assumes the sign of $V_A$, which in fact happens when the fault approaches the capacitor $C_I$.

$V_D/J$ reverses its sign as it passes through zero when $Z_1=(Z_1)_2$ and therefore the phase relation between $V_A$ and $V_D$ changes when $Z_1=(Z_1)_2$ The physical meaning is that when $Z_1$ becomes smaller than $(Z_1)_2$, the fault current becomes capacitive.

$(Z_1)_1$ and $(Z_1)_2$ are determined by considering that:

$$\frac{V_B}{V_A} < 0 \text{ for } Z_1 > -\frac{Z_A Z_T}{Z_3\left(1+\frac{Z_G Z_T}{Z_3^2}\right)}$$

Therefore: $(Z_1)_1 = -\dfrac{Z_A Z_T}{Z_3\left(1+\dfrac{Z_G Z_T}{Z_3^2}\right)}$ $$\frac{V_A}{V_D} < 0 \left(\text{or } \frac{V_{1A}}{V_D} > 0\right) \text{ for } Z_1 > -\frac{Z_A Z_T}{Z_3\left(1+\frac{Z_2 Z_G}{Z_C Z_3}\right)}$$

Therefore: $(Z_1)_2 = -\dfrac{Z_A Z_T}{Z_3\left(1+\dfrac{Z_A Z_G}{Z_C Z_3}\right)}$ Note that $|(Z_1)_2| > |(Z_1)_1|$ Similarly, $V_B-V_D/J$ reverses sign as it passes through zero when $Z_1=(Z_1)_3$ and therefore the phase relation between $V_B-V_D$ and $V_A$ changes as $Z_1$ passes through the value $(Z_1)_3$. In the same manner, the phase relation between $V_B-V_D$ and $V_A-V_D$ reverses when $Z_1$ becomes smaller than $(Z_1)_3$.

It can be shown as previously that:

$(Z_1)_3 = -(Z_A Z_T/Z_3)$ and it is noted that:

$(Z_1)_3 < (Z_1)_2 < (Z_1)_1 < 0$

To summarize, the relative phases of the measured magnitudes as compared to the fault current J when the line I if faulty, are listed in the Table III below.

The symbol — represents a phase discordance,

The symbol + represents a phase concordance.

It may be seen that Tables I and II directly derive from this Table III.

TABLE III

| | $\frac{V_D}{J}$ | $\frac{V_A}{J}$ | $\frac{V_A - V_D}{J}$ | $\frac{I_{1A}}{J}$ | $\frac{I_{2A}}{J}$ | $\frac{V_B}{J}$ | $\frac{V_B - V_D}{J}$ | $\frac{I_{1B}}{J}$ | $\frac{I_{2B}}{J}$ |
|---|---|---|---|---|---|---|---|---|---|
| $Z_1>0, Z_2>0$ | + | + | − | + | − or + | + | − | + | + or − |
| $(Z_1)_1<Z_1<0$ | + | − | − | + | − | + | − | + | + |
| $(Z_1)_2<Z_1<(Z_1)_1$ | + | − | − | + | − | − | − | − | + |
| $(Z_1)_3<Z_1<(Z_1)_2$ | − | − | − | + | − | − | + | − | + |
| $Z_1<(Z_1)_3$ | − | − | − | + | − | + | + | − | + |

It may be noted that when $Z_1=(Z_1)_1$, the voltage $V_B$ and the current $I_{1B}$ both pass through zero. Consequently, the directional unit $R_2$ provides an unreliable indication. However, it is still possible to obtain a correct indication from the three other directional indications which enable the ambiguity to be resolved as explained above.

Referring briefly again to FIG. 5, the commands for the tripping of lines I and II which appear on lines 16 and 18 respectively, act to cause the tripping of the line at station B by means of the tripping devices 21 and 22, provided however that, in general, certain other conditions not relevant to the present discussion are satisfied. Similar opening devices are provided at the station A which, according to the teleprotection procedures, respond to the corresponding line tripping command so that both ends of the line are opened.

It will also be noticed that the inputs 44 and 62 of the AND gates 40 and 60 are not strictly necessary. According to a complementary aspect of the invention, it is indeed observed that three directional indications out of the four considered are sufficient to indicate the presence or the absence of a fault on one of the previously selected lines I or II. In practice, if one considers line I at station B for example, the indications from relays $R_1$, $R_3$ and $R_2$ are sufficient to determine whether the fault is on the line, or, on the contrary, whether it is either on line II or backward of station B, whereas the ambiguity disclosed above does not occur in the case of a fault backward of A. Thus, when a given line is considered at a given station, the indication from the directional unit attached to the other line at this station is irrelevant to the determination of the presence of the fault relative to the first line.

The technique described in the foregoing is applicable to total impedance or backward impedance directional relays, whatever their mode of operation such as for example, interphase, homopolar or inverted.

It should also be noted that the directional indication obtained in all the contemplated cases is correct, whether the capacitors $C_I$ and $C_{II}$ are in operation or not, together or separately, in the position represented in FIG. 1, that is to say, on the same side relative to the middle of each line.

Of course, alternatives may be contemplated for the practice of the invention without departing from the principles just described. In particular, these may be applied to the case of N lines connected in parallel (N>2) in an electric link.

I claim:

1. A method for detecting the location of a fault occurring on an electric link, the link comprising two parallel lines each having respective ends extending between a first and a second point of this link, and each line including a compensating capacitor in series between its ends, said method comprising the steps of:

(a) detecting at each end of each line the apparent forward or backward direction of a fault on the electric link;
(b) generating, at each end of each line, a first signal indicative of a detected forward fault and a second signal indicative of a detected backward fault; and
(c) generating a signal indicative of the presence of a fault on a first of the two lines when a forward fault signal is generated at both ends of said first line, and wherein:
(d) said signal indicative of a fault on said first of the two lines is also generated when a forward fault signal is generated at the first end of said first line and a backward fault signal is generated at the second end of this first line, provided that a backward fault signal is generated at the first end of said second line.

2. The method of claim 1, wherein, in step (d), an indication of the presence of a fault of said first line is generated when a backward fault signal is generated at the first end of the second line only if a forward fault signal is also generated at the second end of said second line.

3. The method of either claim 1 or 2 further including the step of disconnecting each of said ends of at least said first line in response to there being generated a signal indicative of a fault on said first line.

4. A device for detecting the location of a fault occurring on an electric link, the link comprising two parallel lines each having respective ends extending between a first and a second point of this link, and each line including a compensating capacitor in series between its ends, said device comprising:
means for detecting at each end of each line the apparent forward or backward direction of a fault on the electric link;
means, responsive to said fault detecting means, for generating a first signal indicative of a detected forward fault and a second signal indicative of a detected backward fault; and means for generating a signal indicative of the presence of a fault on a first of the two lines when a forward fault signal is produced at both ends of said first line, and wherein:
said signal indicative of a fault on said first of the two lines is also generated when a forward fault signal is generated at the first end of said first line and a backward fault signal is generated at the second end of said first line, provided that a backward fault signal is generated at the first end of said second line.

5. The device of claim 4 wherein said means for generating a signal indicative of the presence of a fault on a first of the two lines generates a fault indicative signal responsive to the detection of a forward fault at the first end of said first line, a backward fault signal at the second and of said first line, and a backward fault signal at the first end of said second line only if a forward fault signal is also detected at the second end of said second line.

6. The device of claim 4 wherein each said fault detecting means comprises a directional unit located at each end of each of said lines, each directional unit including means for generating at an output a signal at a first logical level upon detection of a forward fault and at a second logical level upon detection of a backward fault, and wherein said means for generating a signal indicative of the presence of a fault on a first of the two lines further comprises for each one of the two lines:
a first AND gate having first and second inputs respectively connected to the outputs of the first and second directional units of said one of the two lines;
a second AND gate having first and second inputs of opposite sign respectively connected to the outputs of the first and second directional units of said one of the two lines, and a third input connected to the output of the first directional unit of the other one of the two lines, said second and third inputs having the same sign, and each AND gate having one output; and
an OR gate having first and second inputs respectively connected to the outputs of said first and second AND gates.

7. The device of claim 6, wherein said second AND gate further includes a fourth input connected to the output of the second unit of the other one of the two lines, said first and fourth inputs having the same sign.

8. The device according to any one of claims 4, 5, 6 or 7 further including means, responsive to the detected presence of a fault on a first of said electric lines, for disconnecting each of said ends of at least said first line.

* * * * *